United States Patent [19]

Matschinsky

[11] Patent Number: 4,828,279
[45] Date of Patent: May 9, 1989

[54] WHEEL SUSPENSION FOR THE DRIVEN REAR WHEELS OF MOTOR VEHICLES

[75] Inventor: Wolfgang Matschinsky, Munich, Fed. Rep. of Germany

[73] Assignee: Bayerische Motoren Werke AG, Munich, Fed. Rep. of Germany

[21] Appl. No.: 172,315

[22] Filed: Mar. 23, 1988

[30] Foreign Application Priority Data

Apr. 28, 1987 [DE] Fed. Rep. of Germany ....... 3714034

[51] Int. Cl.$^4$ .............................................. B60G 3/18
[52] U.S. Cl. .................................................... 280/690
[58] Field of Search ...................... 280/688, 660, 96.1, 280/671, 675, 700, 701, 724, 690, 673, 666

[56] References Cited

U.S. PATENT DOCUMENTS

| | | | |
|---|---|---|---|
| 4,556,238 | 12/1985 | Matschinsky | 280/660 |
| 4,591,184 | 5/1986 | Matschinsky | 280/673 |
| 4,657,271 | 4/1987 | Salmon | 280/675 |
| 4,681,342 | 7/1987 | Goerich | 280/701 |
| 4,722,544 | 2/1988 | Weber | 280/688 |
| 4,744,587 | 5/1988 | Veneau | 280/701 |

FOREIGN PATENT DOCUMENTS

| | | |
|---|---|---|
| 1938850 | 5/1970 | Fed. Rep. of Germany. |
| 2518931 | 5/1973 | Fed. Rep. of Germany. |
| 2355954 | 5/1975 | Fed. Rep. of Germany. |
| 2416616 | 10/1975 | Fed. Rep. of Germany. |
| 2543189 | 4/1977 | Fed. Rep. of Germany. |
| 199312 | 11/1984 | Japan. |

OTHER PUBLICATIONS

German "Fahrwehrtechnik", I. Reimpell, pp. 228, 229, Grundlagen.
Autombiltechnische Zeitschrift 79 (1977) p. 220.
U.S. Dept. of Transportation Document, Sixth International Conference on Experimental Safety Vehicles, Oct. 12-15, 1976.

Primary Examiner—Richard A. Bertsch
Attorney, Agent, or Firm—Barnes & Thornburg

[57] ABSTRACT

A wheel suspension includes a wheel carrier (2) supporting the wheel, which is rotatably connected in its lower area by way of the bearings (10, 11) with a bending- and torsion-resistant lower cross guide member (3) about the pivot axis (8). Two upper essentially transversely extending support guide members (12, 13) engage in the upper area of the wheel carrier which, like the cross guide member, are pivotally connected with their inner ends at the vehicle body. The point of intersection (P) of the axis of rotation (7) on the side of the body of the cross guide member with the extension of the pivot axis (8) lies in front of the wheel as viewed in plan view. The wheel side bearing (11) of the cross guide member is constructed elastic approximately in the plane of the cross guide member and relatively stiff perpendicularly thereto. The wheel suspension enables a good starting and brake pitching compensation whereby nonetheless a desired, respectively, freely selectable curve of the wheel steering angle (toe-in curve) over the inward and outward spring deflection of the wheel is achievable.

11 Claims, 1 Drawing Sheet

WHEEL SUSPENSION FOR THE DRIVEN REAR WHEELS OF MOTOR VEHICLES

BACKGROUND AND SUMMARY OF THE INVENTION

The present invention relates to a wheel suspension for the driven rear wheels of motor vehicles, with a wheel carrier supporting the wheel, which is connected by way of cross guide member arranged at a vertical distance from one another with the vehicle body or an auxiliary frame to be fastened thereon, whereby one of the cross guide members is constructed torsion-resistant and is operatively connected on the side of the wheel with the wheel carrier by way of two bearings disposed one behind the other, of which one bearing is more elastic in the plane of the cross guide member than the other.

A wheel suspension of this type (DE-A No. 25 43 189) includes a lower cross guide member which is constructed torsion-resistant about a vehicle transverse axis, as well as an upper simple rod-shaped cross guide member. Moments exerted about a transverse axis by the wheel carrier on the wheel suspension as a result of braking or starting forces are absorbed alone by the lower cross guide member because the upper rod guide member is unable to contribute anything for that purpose. The lower cross guide member is connected with the wheel carrier by way of two bearings disposed one behind the other in plan view, of which the forward bearing is to be radially more soft than the rear bearing. In this manner, the wheel is to experience a toe-in increase under the influence of lateral forces within the scope of the elasticity of the bearing on the wheel carrier side of the lower cross guide member. The pivot axis which is defined by the two bearings of the lower cross guide member on the wheel carrier side, between this cross guide member and the wheel carrier and the pivot axis of the cross guide member on the side of the body intersect in plan view in a point which is located in front of the wheel axis, and this means that also the starting and brake pitching pole is located in front of the axle which is desirable as such. A disadvantage of this axle, however, resides in the fact that the inward spring-deflecting wheel is displaced very markedly in the direction of toe-out which entails a strong oversteering driving behavior in curves.

Another known axle of about this type of construction (Automobiltechnische Zeitschrift 79 "1977" 6, Page 220) therefore provides the point of intersection of the pivot axis of the lower cross guide member on the side of the wheel carrier with the pivot axis of this cross guide member on the body side far to the rear of the wheel axis, as viewed in plan view. The adjustment of the wheel during inward and outward spring deflection in the direction of toe-out is avoided thereby. However, this again leads to the fact that with such a type of wheel suspension, on the one hand, a good starting pitching compensation is possible but, on the other hand, only a relatively small braking pitching compensation is feasible.

The present invention is concerned with the task to provide a wheel suspension of the aforementioned type of construction which enables not only a good acceleration (starting) pitching compensation but also a good deceleration (braking) pitching compensation and additionally makes possible an intentional influencing of the toe-in progress during the inward and outward spring deflection.

The underlying problems are solved in a wheel suspenion of the aforementioned type in that two support guide members disposed one behind the other and extending approximately transversely are provided at a vertical distance from the torsion and bending-resistant cross guide member. The point of intersection of the pivot axis on the side of the wheel carrier and of the pivot axis on the side of the body of the torsion-resistant cross guide member which is located in front of the wheel axis, makes it possible to so select the pole of the wheel suspension that an obliquely forwardly upwardly rising line of action is provided for the brake force as also for the driving force so that not only a good acceleration (starting) pitching compensation, but also a good deceleration (braking) pitching compensation are attainable. Therebeyond, such a strong steering movement about a vertical axis can be imposed upon the wheel carrier during the inward and outward spring deflection movement owing to the support guide members which are arranged at a vertical distance from the torsion-resistant cross guide members and are disposed one behind the other as well as extend transversely, that in the course of the spring movement, no wheel position change in the direction of toe-out but under some circumstances even in the direction of toe-in takes place. The vehicle thus receives a neutral, possibly even understeering driving behavior in the curve.

As the moments exerted by the wheel carrier on the wheel suspension during the starting and during the braking are absorbed exclusively by the bending and torsion-resistant cross guide member, it is more simple to design and match the wheel suspension with regard to the elastokinematics. The wheel suspension furthermore has a small space requirement in the vehicle longitudinal direction. Furthermore, a complete preassembly of the axle at an auxiliary frame or at an elastically suspended driving bogie or the like is possible. Finally, the novel axle also permits additionally an "active" steering of the wheels of this axle, in that one of two upper support guide members is adjusted essentially in the longitudinal direction thereof.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
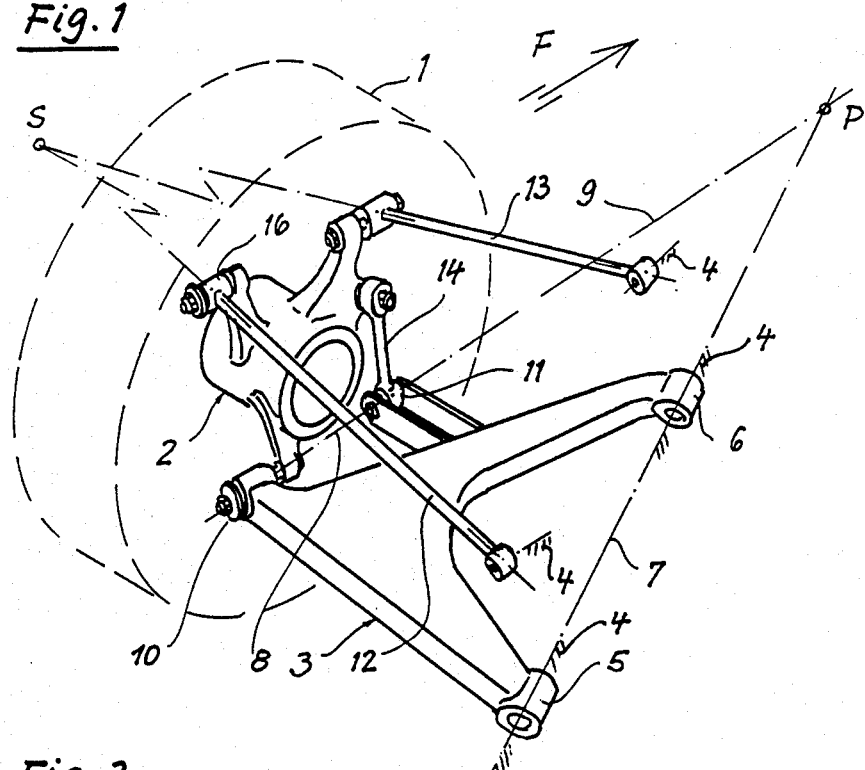
FIG. 1 is a perspective view of the novel wheel suspension in accordance with the present invention.

Referring now to the drawing wherein like reference numerals are used throughout the two views to designate like parts, the wheel suspension illustrated in the drawing involves an individual wheel suspension for a driven rear wheel 1 of a passenger motor vehicle, which is supported by a wheel carrier generally designated by reference numeral 2. In the illustrated embodiment, the lower cross guide member 3 is constructed bending- and torsion-resistant and is pivotally connected at the vehicle body 4 (only schematically indicated) by way of the guiee member bearings 5 and 6. The pivot axis 7 is defined by the guide member bearings 5 and 6. The cross guide member 3—deviating from the illustrated embodiment—could also be constructed as upper cross guide member of the wheel suspension. Furthermore, the bending—and torsion-resistant cross guide member could also be pivotally connected at an auxiliary frame to be threadably secured at the vehicle body or at a driving bogie to be elastically connected with the vehicle body. Finally, also the individual axes of rotation of the guide member bearings 5 and 6 could be at an angle, respectively, inclined to the axis of rotation 7. The wheel carrier 2 is movable with respect to the cross guide member 3 about a pivot axis 8 extending approximately in the vehicle longitudinal direction.

The point of intersection P of the pivot axis 7 of the torsion-resistant cross guide member 3 on the side of the body with the connecting line 9 forming the pivot axis 8 of the bearings 10 and 11 on the wheel side of the cross guide member 3 is located in front of the wheel 1 as viewed in plan view.

Two rod-like support guide members 12 and 13 disposed one behind the other and extending approximately transversely are provided at a vertical distance above the torsion-resistant cross guide member 3 which are pivotally connected with their outer ends at the wheel carrier 2 and with their inner ends at the vehicle body 4, respectively, at an already mentioned auxiliary frame or driving bogie.

One of the bearings 10, respectively, 11 on the wheel side—in the illustrated embodiment the bearing 11—is elastically connected with the wheel carrier 2 approximately in the plane of the cross-guide member 3 and relatively stiffly approximately perpendicularly thereto. In the preferred embodiment illustrated in the drawing, this takes place in that a swing-arm support 14 is pivotally connected at the cross guide member 3 and at the wheel carrier 2, which support 14 is directed at least approximately perpendicularly to the plane of the cross guide member 3. In this manner, vertical forces can be readily transmitted from the cross guide member 3 to the wheel carrier 2 by way of the swinging support 14 whereas a horizontal relative movement between the cross guide member 3 and the wheel carrier, which takes place in the plane of this cross guide member 3, is possible without difficulty.

The bearing 10—in the illustrated embodiment rear bearing—between the cross guide member 3 and the wheel carrier 2 forms a "fixed bearing", so to speak of, which can be formed by an axially and radially guiding rubber bearing. The guide member bearings 5 and 6 constructed as rubber bearings take over also the elastic "longitudinal spring action" of the wheel suspension in that they permit a small longitudinal displacement and possibly also a pivoting of the cross guide member 3 about a vertical axis.

Figure 2:
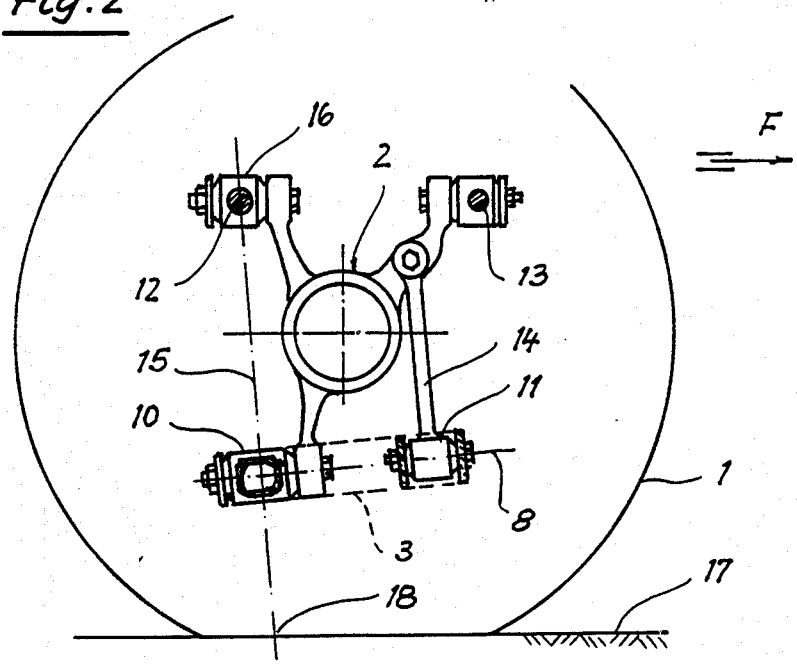
FIG. 2 is a side elevational view from the inside on the wheel carrier of the wheel suspension in accordance with the present invention.

As can be seen from FIG. 2, the connecting line 15 of the fixed bearing 10 on the wheel side of the cross guide member 3 with the bearing 16 on the wheel side of the rear upper support guide member 12 extends in side view through the road surface 17 approximately at the point of engagement 18 of a lateral force acting on the wheel 1. This has as a consequence that wheel lateral forces are absorbed far-reachingly by the cross guide member 3 alone by way of the fixed bearing 10 and by the support guide member 12 so that in case of lateral forces the support guide member 13 is stressed additionally slightly which possibly simplifies the possibility to obtain an active steerable rear axle by axial adjustment of this support guide member 13. The adjusting forces are thereby also comparatively small.

It can be seen from FIG. 1 that in plan view the axes of the two support guide members 12 and 13—as is known as such for individual wheel guide members—have a point of intersection S that is located on the side of the wheel 1 opposite the vehicle center. In this manner, it can be achieved by correct matching of the elastic pivotal connections of the torsion-resistant cross guide member 3 (longitudinal spring action) and of the pivotal connections of the two support guide members 12 and 13 that the elastic toe-in changes are compensated both for the load case "braking" as also for the load case "driving," respectively—if this is desired—are even over-compensated.

In order to control elastically conditioned wheel position changes, it may also be appropriate to displace the swing-arm support 14 further toward the vehicle center with respect to the position illustrated in the drawing.

Furthermore, the spring system of the wheel suspension is not illustrated in the drawing. The spring and the shock absorber will appropriately engage at the bending- and torsion-resistant cross guide member 3. In order to gain installation space, it may thereby be advantageous, to incline the spring and shock absorber upwardly inwardly. Both may additionally be supported with their upper ends at the already mentioned auxiliary frame or driving bogie which entails assembly facilitations for the entire axle which therebeyond can be adjusted as regards its toe-in and camber values already prior to the installation in the vehicle body.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension for the driven rear wheels of motor vehicles, comprising a wheel carrier means supporting the wheel, cross guide means operatively connecting the wheel carrier means with a relatively fixed vehicle part, said cross guide means being arranged at a vertical spacing from one another, one of the cross guide means being constructed torsion-resistant and being operatively connected with the wheel carrier means on the side of the wheel by way of two bearings means disposed one behind the other, one of said bearing means being more elastic in the plane of the cross guide means than the other bearing means and formed by a swinging support means which is at least approximately vertically arranged with respect to the plane of the cross guide means and is pivotally connected at the wheel carrier means and at the cross guide means, the point of intersection of the axis of rotation of the torsion-resistant cross guide means on the side of the body with the connecting line of the bearing means of said cross guide means on the wheel side being located in front of the wheel, as viewed in plan view, and two support guide means extending approximately transversely and disposed one behind the other which are provided at a vertical spacing from the torsion-resistant cross guide means.

2. A wheel suspension according to claim 1, wherein the torsion-resistant cross guide means is the lower cross guide means.

3. A wheel suspension according to claim 1, wherein the second bearing means on the side of the wheel coordinated to the elastic bearing means of the cross guide means is located to the rear of the elastic bearing means, as viewed in plan view.

4. A wheel suspension according to claim 3, wherein, said second bearing means effectively forms a substantially fixed bearing means.

5. A wheel suspension according to claim 4, wherein in side view the connecting line of the fixed bearing means of the cross guide means on the side of the wheel with the bearing means of the rear support cross guide means on the side of the wheel extends through the road surface approximately at the point of engagement of a lateral force acting on the wheel.

6. A wheel suspension according to claim 3, wherein in plan view the axes of the two support guide means have a point of intersection on the side of the wheel opposite the vehicle center.

7. A wheel suspension according to claim 4, wherein the torsion-resistant cross guide means is the lower cross guide means.

8. A wheel suspension according to claim 7, wherein in plan view the axes of the two support guide means have a point of intersection on the side of the wheel opposite the vehicle center.

9. A wheel suspension according to claim 8, wherein said second bearing means effectively forms a substantially 00 fixed bearing means.

10. A wheel suspension according to claim 9, wherein in side view the connecting line of the fixed bearing means of the cross guide means on the side of the wheel with the bearing means of the rear support cross guide means on the side of the wheel extends through the road surface approximately at the point of engagement of a lateral force acting on the wheel.

11. A wheel suspension according to claim 1, wherein in plan view the axes of the two support guide means have a point of intersection on the side of the wheel opposite the vehicle center.

* * * * *